Nov. 15, 1927.
J. P. RATIGAN
1,649,078
ROD ROTATING AND SHOCK ABSORBING DEVICE
Filed Sept. 21, 1925
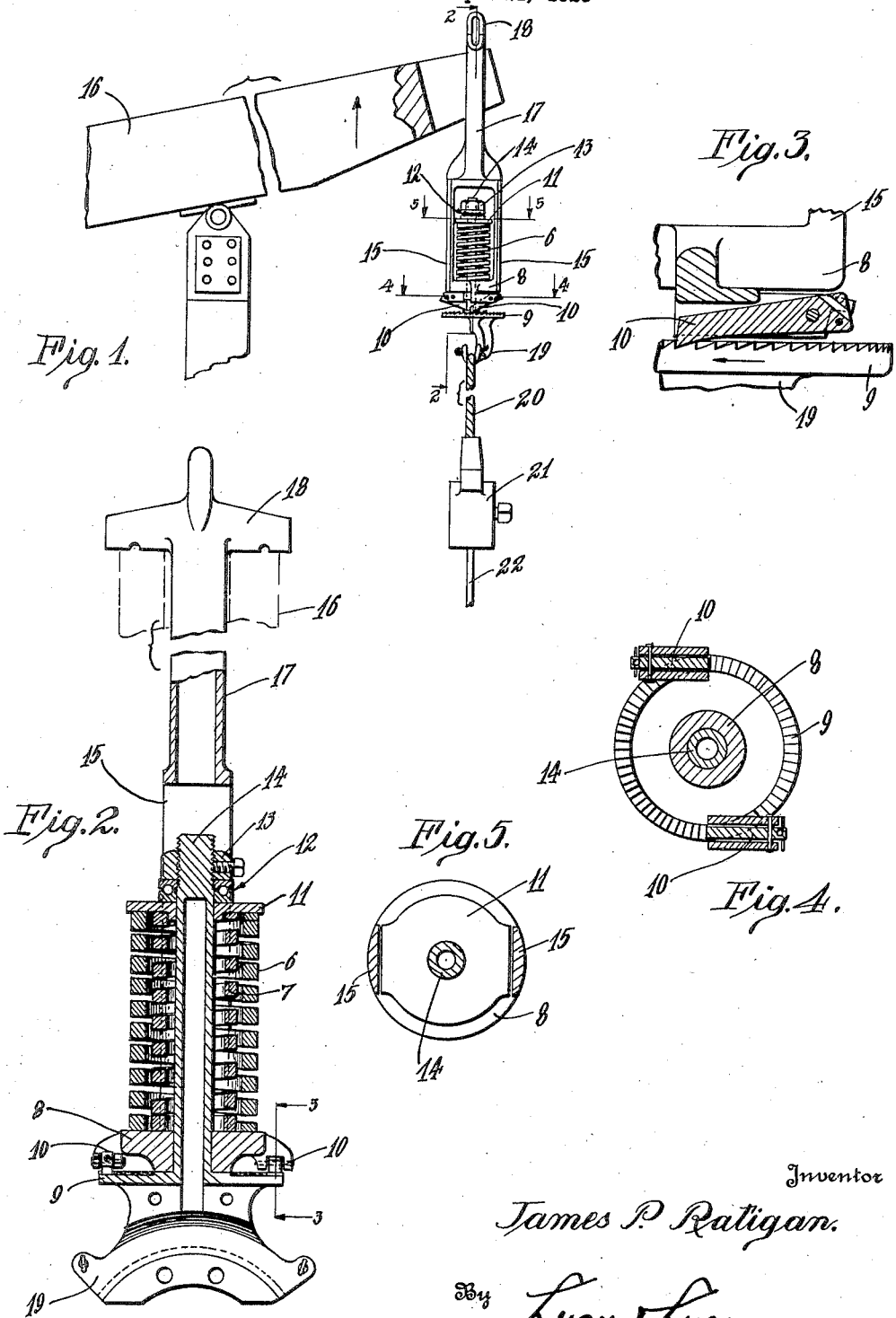
Inventor
James P. Ratigan.
By Lyon & Lyon
Attorneys.

Patented Nov. 15, 1927.

1,649,078

UNITED STATES PATENT OFFICE.

JAMES P. RATIGAN, OF WALNUT PARK, CALIFORNIA.

ROD-ROTATING AND SHOCK-ABSORBING DEVICE.

Application filed September 21, 1925. Serial No. 57,665.

This invention relates to devices of the character employed in rotating polish rods of deep well pumps and also relates to devices of the type employed for absorbing the shock produced by the walking beam or other operating member when it picks up the load as it starts on its upstroke.

An object of the invention is to effect rotation of the polish rod and minimize shock thereupon by a simple combination of elements having a mode of operation that will accomplish the dual results.

Another object of the invention is to provide a rod rotating device in which the rotary movement is obtained by the alternate compression and expansion of a coil spring, the spring being compressed by picking up the load and then allowed to expand as the pump plunger descends.

It is to be understood that the device is not limited to use in a pumping apparatus but that it may be used wherever the functions of rotation and shock absorbing are desirable.

The accompanying drawings illustrate the invention:

Fig. 1 is a side elevation of a polish rod rotating and shock absorbing device constructed in accordance with the provisions of this invention, said device being in operating position upon an operating member fragmentarily shown, and a polish rod clamp together with a fragment of polish rod being shown suspended from the device. The parts are in the positions they occupy when the operating member is on its upstroke and the full load of the pump is imposed thereon.

Fig. 2 is an enlarged elevation of the device mainly in vertical midsection on the line indicated by 2—2, Fig. 1.

Fig. 3 is an enlarged sectional detail on the line indicated by 3—3, Fig. 2.

Fig. 4 is an enlarged plan view, partly in section, on the line indicated by 4—4, Fig. 1.

Fig. 5 is an enlarged plan view, partly in section, on the line indicated by 5—5, Fig. 1.

An important feature of the invention is the utilization of the expansive force of a spring to effect rotary motion of a polish rod or other member to which the device may be connected. Such a spring is indicated in the drawings at 6. In this instance I preferably employ a plurality of springs and a second spring is indicated at 7 inside of the first spring. The plurality of springs is preferred because of a better distribution of the load upon the spring means, but it is to be understood that the device is operative with but one spring.

The springs 6, 7 at one end bear against and are supported by a member 8. Another member 9 is shiftably and rotatably mounted relative to the member 8 and between the members 8, 9 is suitable means for effecting intermittent motion in one direction of the member 9 when a relative reciprocation takes place between the members 8, 9, as it would upon alternate compression and expansion of the springs.

The member 9, in this instance, constitutes a ratchet member and pivoted to the member 8 are pawls 10 that cooperate with the ratchet member to effect intermittent turning of the member 9, but it will be readily understood, without further illustration, that the pawls 10 could be on the member 9 and the member 8 could constitute the ratchet member, since such construction is merely the reverse of that shown. The load is impressed on the springs 6, 7 by a member 11 which is positioned at the ends of the springs opposite to the ends that engage the member 8. Thus the member 11 is yieldingly supported by the springs. In this particular instance the member 11 supports one member 12 of an antifriction bearing. The other member 13 of the antifriction bearing is secured in any suitable manner to a stem 14 which constitutes a portion of the member 9 and on which the member 8 is mounted to turn.

The member 8 forms one end of a yoke, the spaced arms of which are indicated at 15 and the springs, in this instance, are positioned between said arms. The upper end of the yoke is connected in any suitable manner to an operating member which is fragmentarily indicated at 16. The connection in this instance is established by a stem 17 that connects with the yoke, and a cross head 18 on the stem. In the instance shown in Fig. 1 the cross head 18 rests upon the operating member 16 which is shown in the form of a walking beam.

The member 9 may be connected in any suitable manner with the member that is to be rotated. In the particular instance shown in the drawings, the member 9 has a downwardly extending grooved portion 19 to receive the bight of a cable which is indicated at 20 in Fig. 1. This cable suspends a polish rod clamp 21 secured to a polish rod 22 of a pump, of which the other parts are not illustrated.

From the foregoing it will be readily understood that relative movement of the members 8, 9 away from each other effects compression of the springs 6, 7, and that expansion of said springs effects relative movement of said members toward each other, thus to cause the pawls to alternately slip over and push against the teeth of the ratchet member 9.

The construction described above, when the device is suspended, in the manner shown in Fig. 1, from a walking beam and is connected with the polish rod of a deep well pump, operates as follows:

It will be assumed, at the start, that the walking beam 16 is moving on its upstroke with the full load of the pump imposed on the springs 6, 7, thus compressing said springs as in Fig. 1 and so permitting the member 8 to draw away from the member 9, thus causing the pawls 10 to slip over one or more of the ratchet teeth.

The end of the upstroke of the walking beam 16 being reached, it starts on the downstroke, and the load on the springs lessens, thus permitting said springs to expand to draw the member 8 toward the member 9, thus causing the pawls to catch in the ratchet teeth and swing upward relative to the member 9 so as to increase the horizontal distance between the pawl pivots and vertical planes passing through the teeth that are engaged by the pawls, thus causing the pawls to thrust against the member 9 and turn said member 9 in the direction of the arrow thereon in Fig. 3. Turning of the member 9 effects turning of all of the elements suspended therefrom, including the polish rod 22.

The walking beam 16, having reached the end of its downstroke, starts on its upstroke, thus again compressing the springs, which thus prevent sudden shock from being imposed on the sucker rods. The operations above described are repeated as long as the walking beam 16 is operated, thus intermittently rotating the polish rod in one direction. Thus the same springs function to absorb the shocks on the upstrokes of the walking beam and to effect turning of the polish rod on the downstrokes of said walking beam.

It will be readily understood that any other suitable resilient member may be employed in lieu of the springs 6, 7.

I claim:

A rod rotating and shock absorbing device comprising a member adapted to be suspended from an operating member, a resilient member supported by said member, a second member rotatably mounted on the resilient member and adapted to be connected with the polish rod of a pump, and pawl and ratchet means connecting the first and second members operable by relative shifting of the first and second members to rotate the second member.

Signed at Los Angeles, Calif., this 14 day of September, 1925.

JAMES P. RATIGAN.